(No Model.) 6 Sheets—Sheet 1.
O. T. BLÁTHY.
ELECTRIC METER FOR ALTERNATING CURRENTS.
No. 423,210. Patented Mar. 11, 1890.
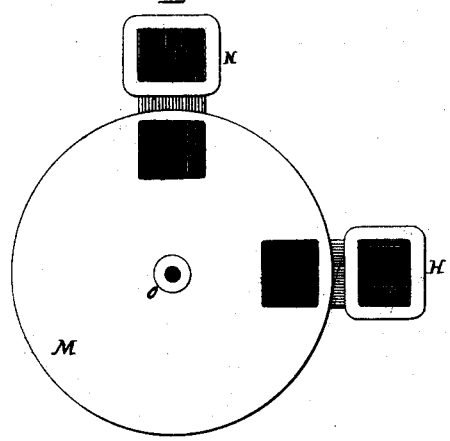
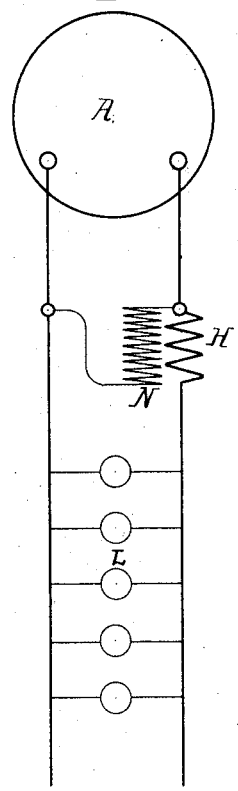
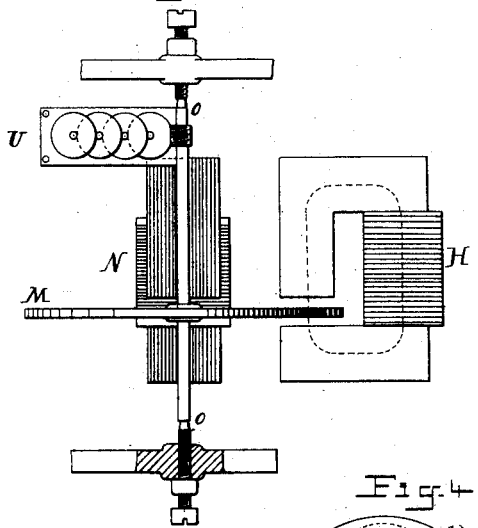
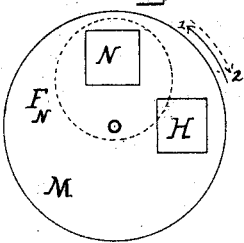 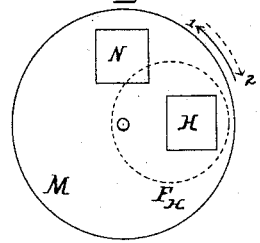
WITNESSES:
George Baumann
John Revell
INVENTOR
Otto T. Bláthy
BY
Howson and Howson
ATTORNEYS (No Model.) 6 Sheets—Sheet 2.
O. T. BLÁTHY.
ELECTRIC METER FOR ALTERNATING CURRENTS.
No. 423,210. Patented Mar. 11, 1890.

WITNESSES:
George Baumann
John Revell

INVENTOR
Otto T. Bláthy
BY
Howson and Howson
ATTORNEYS (No Model.) 6 Sheets—Sheet 3.

O. T. BLÁTHY.
ELECTRIC METER FOR ALTERNATING CURRENTS.

No. 423,210. Patented Mar. 11, 1890.

WITNESSES:
George Baumann
John Revell

INVENTOR
Otto T. Bláthy
BY
Howson and Howson
ATTORNEYS (No Model.) 6 Sheets—Sheet 4.

O. T. BLÁTHY.
ELECTRIC METER FOR ALTERNATING CURRENTS.

No. 423,210. Patented Mar. 11, 1890.

WITNESSES:
George Baumann
John Revell

INVENTOR
Otto T. Bláthy
BY
Howson and Howson
ATTORNEYS (No Model.) 6 Sheets—Sheet 5.
O. T. BLÁTHY.
ELECTRIC METER FOR ALTERNATING CURRENTS.
No. 423,210. Patented Mar. 11, 1890.
Fig. 24.
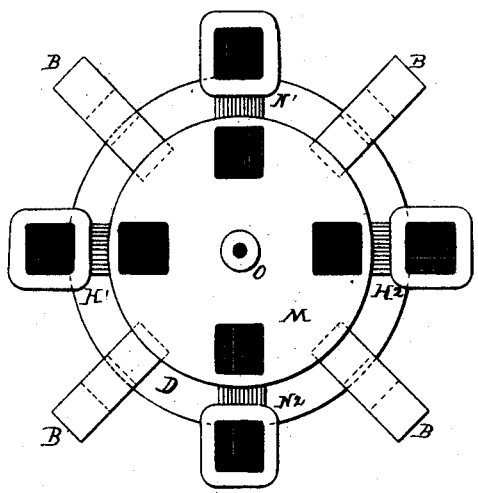
Fig. 25.
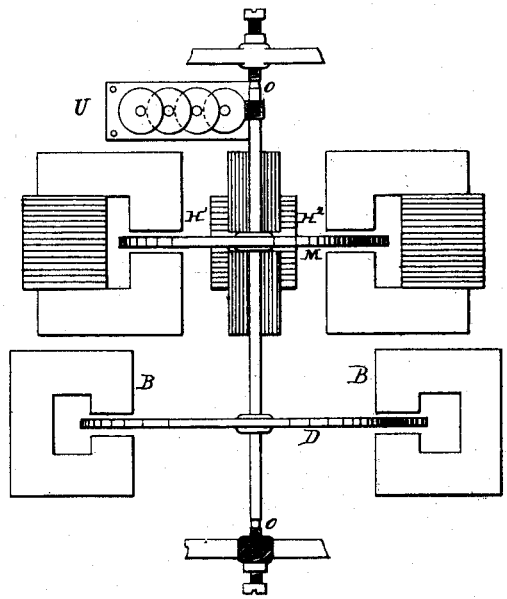
Fig. 23.
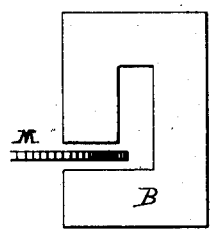
Fig. 23.A
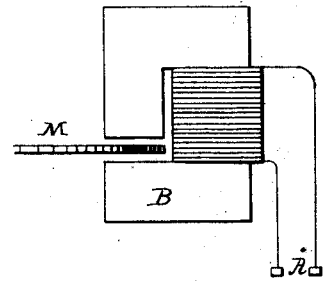
Fig. 26.
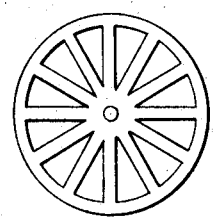
WITNESSES:
George Baumann
John Revell
INVENTOR
Otto T. Bláthy
BY
Howson and Howson
ATTORNEYS (No Model.) 6 Sheets—Sheet 6.
O. T. BLÁTHY.
ELECTRIC METER FOR ALTERNATING CURRENTS.
No. 423,210. Patented Mar. 11, 1890.
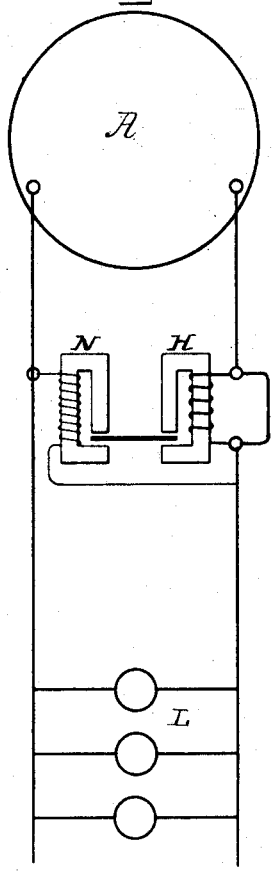
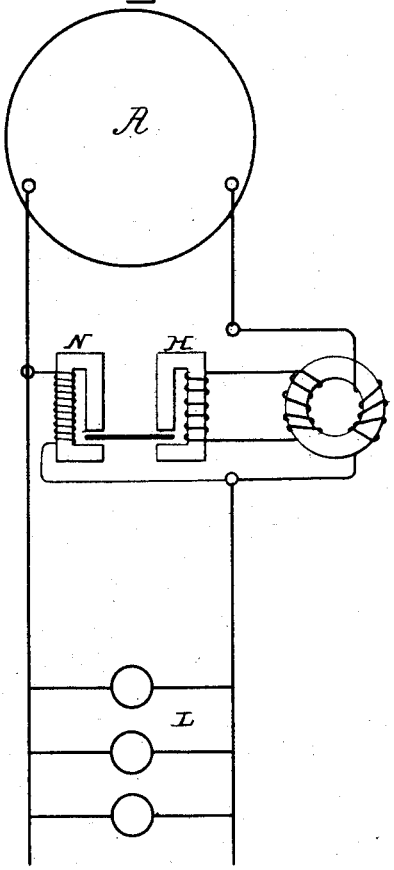
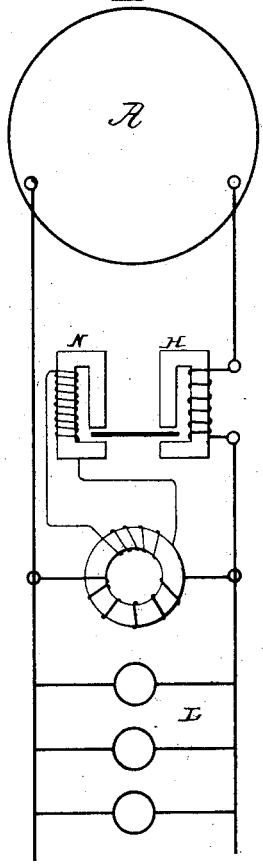
WITNESSES:
George Baumann
John Revell
INVENTOR
Otto T. Bláthy
BY
Howson and Howson
ATTORNEYS

UNITED STATES PATENT OFFICE.

OTTO TITUS BLÁTHY, OF BUDA-PESTH, AUSTRIA-HUNGARY.

ELECTRIC METER FOR ALTERNATING CURRENTS.

SPECIFICATION forming part of Letters Patent No. 423,210, dated March 11, 1890.

Application filed October 7, 1889. Serial No. 326,163. (No model.)

*To all whom it may concern:*

Be it known that I, OTTO TITUS BLÁTHY, a subject of the King of Hungary, and a resident at Buda-Pesth, Austria-Hungary, have invented an Electricity-Meter for Alternating Currents, of which the following is a specification.

This invention consists of an electricity-meter for alternate currents, which is intended to measure the electrical energy consumed in any circuit during a certain time—that is, to express the energy by the number of revolutions made in this time by some rotating body.

This meter, essentially, consists of a metallic rotating body (such as a disk or cylinder, for instance) which is acted upon by two magnetic fields or two groups of fields displaced in phase from one another. The said displacement of phases results from the fact that a field or one group of fields is produced by the main current, while the other field or group of fields is excited by a coil of great self-induction shunted from those points of the circuit between which the energy consumed is to be measured. The magnetic fields, however, do not cross one another within the solid of revolution, as in the well-known arrangement of Ferraris, but pass through different parts of the same independent from one another.

In the accompanying drawings, Figure 1 is a sectional view of an electricity-meter embodying my invention. Fig. 2 is a corresponding side view with a part broken away. Fig. 3 is a diagram showing how the meter may be connected in circuit. Figs. 4 to 9, inclusive, are diagrams to illustrate the operation of the meter. Fig. 10 is a sectional view, and Fig. 11 a side view, of another form of my meter. Figs. 12 and 13 are diagrams to illustrate its operation. Figs. 14, 15, and 16 are sectional views of meters of modified forms. Figs. 17 and 18 are views of another modification. Figs. 19, 20, and 21 are views of other modifications, with the rotating metallic body in the form of a hollow cylinder. Figs. 22 to 25, inclusive, are views of meters provided with magnetic brakes. Figs. 26, 27, and 28 are views of different forms of the metallic rotating body; and Figs. 29, 30, and 31 are diagrams illustrating some of the different ways in which the meter may be connected up in circuit.

Figs. 1 and 2 show a simple form of this electricity-meter with two magnetic fields. Here the rotating body, which is acted upon by the two fields H and N, displaced in phase from one another, is formed as a disk M, made of any metal—such as copper, iron, aluminium, or German silver, for instance. If the winding of the electro-magnet H is traversed by the main current and that of the electro-magnet N is shunted between the mains, (*vide* Fig. 3, where A is any source of alternate currents, and L are any current-consuming devices coupled in parallel,) the disk M will commence to rotate. The direction of revolution is determined by the connection of the two electro-magnets. If they are connected so as to have equal direction of lines of force, (under the assumption that there would exist no displacement of phases,) the disk will move from the series magnet toward the shunt-magnet. If the manner of connection is the opposite one, the revolution will take place in the opposite direction. The number of revolutions is recorded by some suitable counting apparatus, such as indicated at U, Fig. 2, and receiving motion from the spindle O of the disk M.

The phenomenon of revolution may be explained as follows: Both the electro-magnets N and H produce induced eddy currents within the disk M in consequence of the fluctuations of the existing currents. The path of mean current-lines is shown in the diagrams, Figs. 4 and 5, by the dotted curves $F^H$ and $F^N$. If the inductive resistance of the shunt-winding N is very great as compared with its ohmic resistance, its phase of magnetization will be displaced for nearly one-quarter of a phase from that of the series magnet, as is shown in Figs. 6 and 7, where $Z^H$ is the wave of series magnetization and $Z^N$ that of shunt magnetization.

Fig. 6 shows the magnets connected so as to have apparently equal polarity. In this case the phase of the shunt-magnet N will lag behind that of the series magnet H; consequently the phase of the eddy (or Foucault) currents induced by the former (represented by the dotted wave $F^N$) will also lag behind that of the eddy currents $F^H$ induced by the series field for nearly one-quarter of a phase. When the eddy currents of one field are at their maximum value, those of the other field will pass through zero, and vice versa. The maximum values of the eddy currents $F^H$ and $F^N$ very nearly coincide with the maxima of the magnetizations $Z^N$ and $Z^H$, as may be seen from Fig. 6, and the eddy currents $F^H$ will always be attracted by the magnet N, Fig. 5, arrow 1, while the eddy currents $F^N$ will always be repulsed by H, Fig. 4, arrow 1. The rotation therefore will continually take place from H toward N.

Fig. 7 shows the diagrammatic waves when the two electro-magnets are connected so as to have apparently opposed polarities. It also shows that the eddy currents $F^H$ are repulsed by the magnet N, while those $F^N$ are attracted by the magnet H. The disk therefore will rotate in the direction of the dotted arrow 2 in Figs. 4 and 5. The rotation of the disk through the two magnetic fields produces within the solid of the disk eddy currents $B^H$ and $B^N$, whose path may be seen in Figs. 8 and 9. These eddy currents $B^H$ and $B^N$ will retard the disk M, as for their production a certain amount of energy is required, which is supplied by the attraction and repulsion of the fields N and H and eddy currents $F^H$ and $F^N$, respectively. In consequence of this retarding action the number of revolutions of the disk will always be such as to make the work done and that expended equal to one another.

It has already been mentioned that two groups of magnetic fields may be employed instead of two fields only. Figs. 10 and 11 show, as an instance, an arrangement with two series fields $H'$ and $H^2$ and two shunt-fields $N'$ and $N^2$. In order to get an addition of the attractive and repulsive effects of the four fields $H'$, $H^2$, $N'$, and $N^2$ upon the eddy currents produced in the two halves of the disk, ($F^{N'}$ and $F^{N2}$ in Fig. 12 and $F^{H'}$ and $F^{H2}$ in Fig. 13,) the magnet-coils belonging to the same group must be connected so as to generate opposed direction of the lines of force. If, for instance, the lines of force of $H'$ pass downward through the disk M, those of $H^2$ must traverse the disk from below. For this reason electro-magnets of the form shown in Figs. 14, 15, and 16 may be used with great advantage. In Fig. 14 every two electro-magnets placed symmetrically with respect to the disk serve to produce one group of fields. In Figs. 15 and 16 one of these electro-magnets is replaced by the yoke $S'$ $S^2$ without any winding. In Fig. 15 both of the magnets are upon one side of the disk and both the yokes upon the other, while in Fig. 16 an electro-magnet and a yoke are placed upon each side.

The external form of the magnetic fields may be varied in very different ways without altering the nature of this meter. As an illustration, one form with two limbs is shown in Figs. 17 and 18. In all possible cases, however, the fields H and N must be independent from one another and must interfere or intersect nowhere. They are not allowed to cross one another anywhere, nor must they have any common parts. Instead of a disk, any other rotating body may be used—as, for instance, a hollow cylinder.

Fig. 19 shows a meter with two double fields $H'$ and $H^2$ and $N'$ and $N^2$, arranged above one another and acting upon a hollow cylinder M. The manner of working of this apparatus is exactly the same as formerly described. The active and the retarding eddy currents circulate here in the metal of the hollow cylinder, in whose interior one or several subdivided iron parts (cores) S are placed in order to diminish the magnetic resistance of the fields H and N. The iron parts (cores) may advantageously be fixed. They may, however, be constructed to revolve with the rotating body. The form and number of the magnetic fields may here be altered exactly as formerly described.

Fig. 21 shows a variation with two pairs of magnets—that is, eight fields $H'$ to $H^4$ and $N'$ to $N^4$. This electricity-meter will have the number of revolutions of its rotating body proportioned to the energy to be measured within very far limits. Experience shows that these limits may be enlarged still further by using special brake (retarding) magnets acting upon the rotating body M directly or upon any other body kept in movement by M. This brake-magnet may also be applied to all the forms and constructions mentioned above either as a single magnet or as a group of magnets distributed over the circumference of the rotating body.

Fig. 22 shows the meter illustrated in Figs. 1 and 2 provided with a permanent brake-magnet B, of steel, acting upon the disk M, and having a form, Fig. 23, similar to the cores of the electro-magnets H and N. If the brake-magnet, Fig. 23$^a$, is an electro-magnet, it is excited by any source of electricity A—as, for instance, a primary or secondary battery or by an alternate current. The external form of the magnet may be altered in many ways; but care must be taken to choose some form with a magnetic circuit closed as nearly as possible; otherwise the field strength of the magnet, if it were of steel, might be diminished in time.

In Figs. 24 and 25, the meter which was represented in Figs. 10 and 11 is shown with several brake-magnets B, acting upon some separate solid D, which may be in the form of a disk, ring, cylinder, ball, or in any other suitable form. This solid D, as well as M, may be made of one or of several metals.

In Fig. 26 a disk made of two ($a$,) and another made of three ($b$) metals are represented.

Fig. 28 shows a disk provided with radial slots R.

Figure 6:
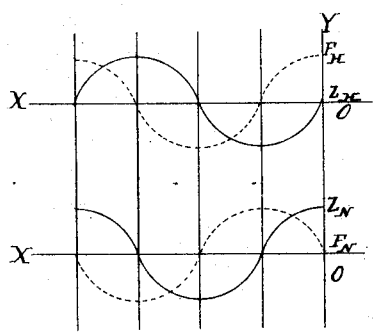
Figure 7:
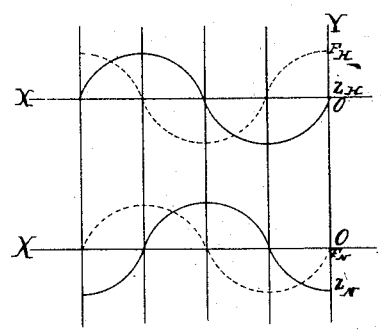
Figure 8:
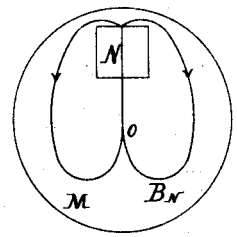
Figure 9:
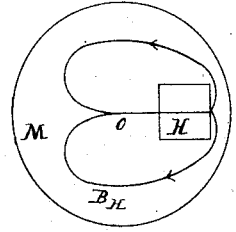
Figure 10:
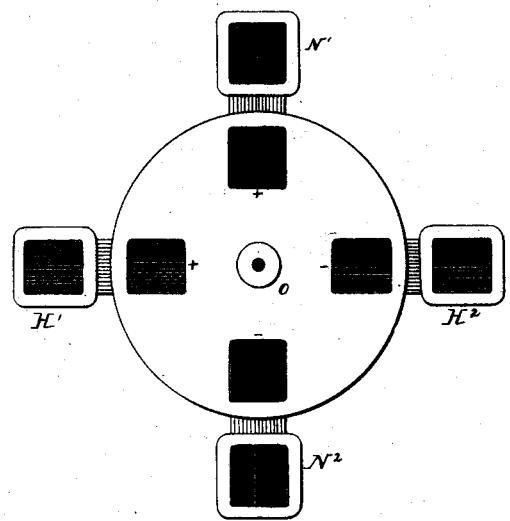
Figure 11:
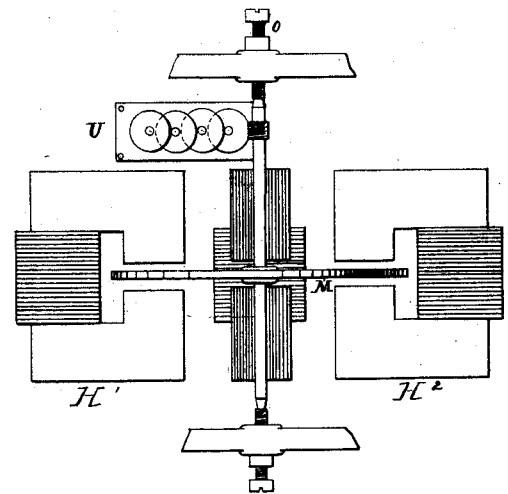
Figure 12:
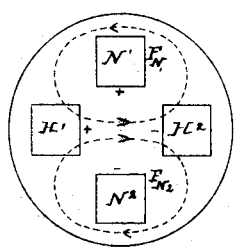
Figure 13:
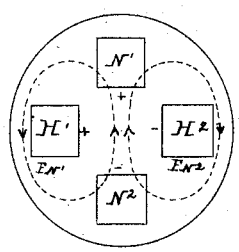
Figure 14:
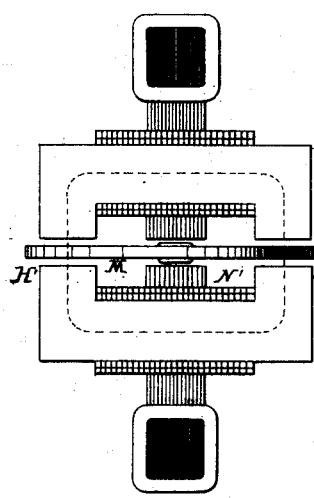
Figure 15:
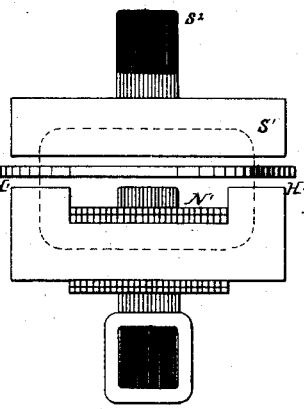
Figure 16:
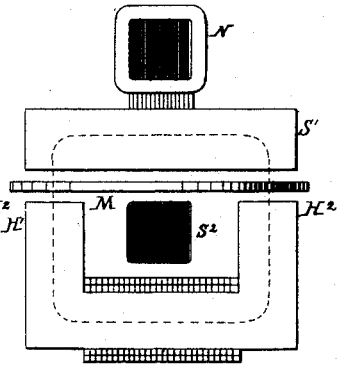
Figure 17:
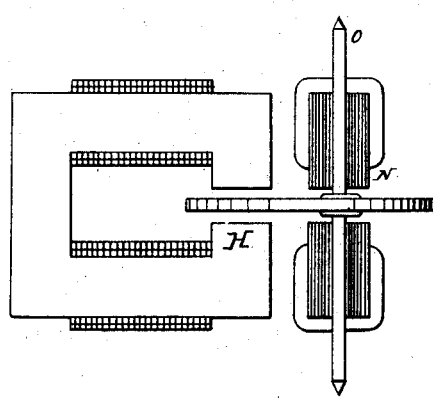
Figure 18:
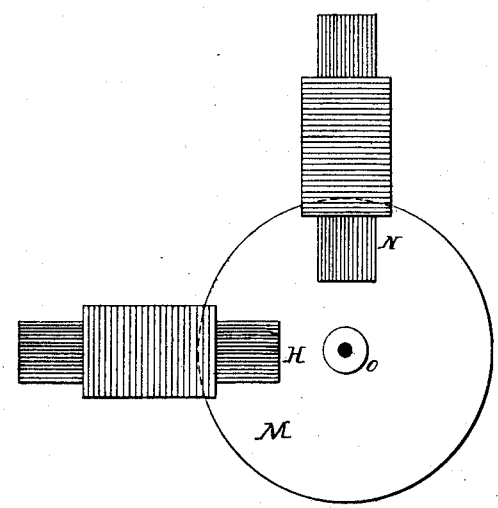
Figure 19:
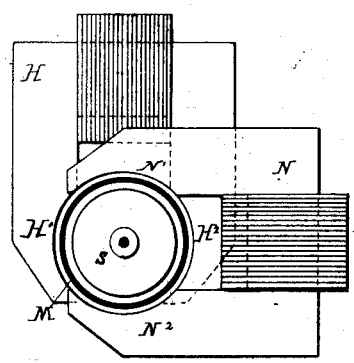
Figure 21:
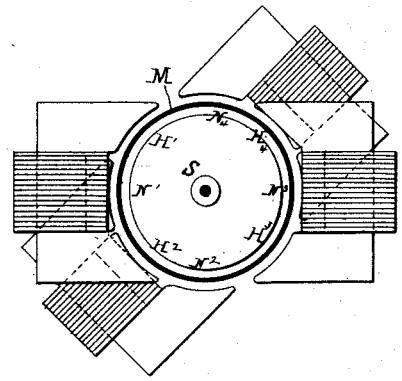
Figure 20:
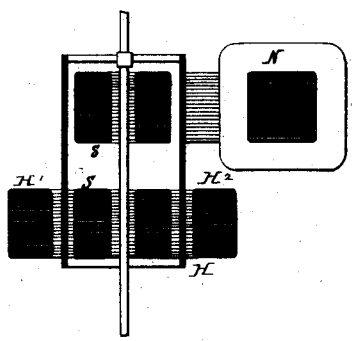
Figure 22:
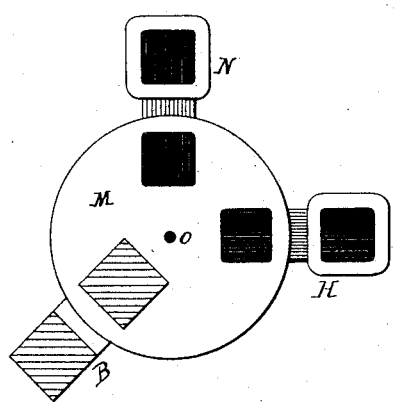
Figure 26:
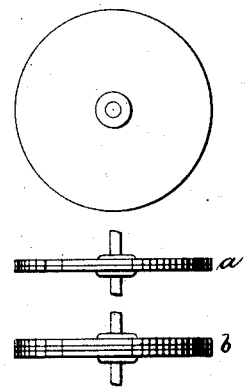
Figure 27:
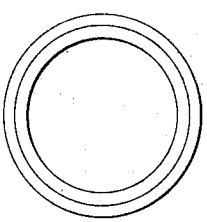
Fig. 27 shows a hollow cylinder made of two metals. The rotating body may be provided with holes or slots to direct the eddy currents into certain paths.

Besides the brake-magnets, or instead of them, any other of the known braking arrangements—such as air-fans or equivalents—may be employed.

Instead of passing the total main current through the apparatus, I may also shunt the whole apparatus in the well-known manner from a fixed resistance passed by the main current; moreover, I may first transform one or both main and shunt current, and then pass them through the apparatus.

In the diagrams, Figs. 29, 30, and 31, A indicates a source of alternating current. L are the consuming or translating devices. H and N represent the two groups of magnetic fields of the meter, as before. In the diagram, Fig. 29, the field H is shown as shunted to a resistance R (which may or may not possess self-induction) in the main line, and in that case, therefore, only part of the main current will traverse H. In Fig. 30 the main current is shown as traversing one convolution of a transformer T, while the secondary coil of this supplies the fields H of the meter. In the diagram, Fig. 31, the fields N of the meter are shown connected to the secondary coil of a transformer T, whose primary forms a shunt across both lines of the main circuit, while the coil of the magnet H is in series.

I claim as my invention—

1. An electricity-meter for alternating currents, consisting of two electro-magnets or two groups of such electro-magnets independent of and not intersecting or interfering with one another, of which one is excited by the main current, (or a part of it or a secondary current generated by the main current,) while the second electro-magnet or group is excited by a shunt-current to the main lines, (or a secondary current generated by this shunt,) with a metallic rotating body upon which these electro-magnets act inductively and dynamically, and a suitable counting apparatus operated by the rotating body, all substantially as described.

2. An electricity-meter for alternating currents, consisting of two electro-magnets or groups thereof independent of and not intersecting or interfering with one another, of which one is excited by the main current, (or a part of it or a secondary current generated by the main current,) while the second electro-magnet or group is excited by a shunt-current between the main lines, (or a secondary current generated by this shunt,) with a metallic rotating body upon which the electro-magnets act inductively and dynamically, a suitable counting apparatus operated by the rotating body, and one or more brake-magnets for the latter, all substantially as described.

In testimony whereof I have signed my name to this specification in the presence of two subscribing witnesses.

OTTO TITUS BLÁTHY.

Witnesses:
 CLARENCE FELDMANN,
 MORITZ HORR.